United States Patent
Chiu (10) Patent No.: US 7,431,343 B2
(45) Date of Patent: Oct. 7, 2008

(54) JOINT STRUCTURE FOR QUICKLY CONNECTING CORRUGATED PIPE

(76) Inventor: Teh-Tsung Chiu, 122, Wugong Road, Wugu Industrial Park, Taipei County (TW)

( * ) Notice: Subject to any disclaimer, the term of this patent is extended or adjusted under 35 U.S.C. 154(b) by 0 days.

(21) Appl. No.: 11/682,508

(22) Filed: Mar. 6, 2007

(65) Prior Publication Data

US 2008/0217917 A1    Sep. 11, 2008

(51) Int. Cl.
*F16L 11/118* (2006.01)
*F16L 25/02* (2006.01)
*H02G 3/18* (2006.01)

(52) U.S. Cl. .................. 285/151.1; 285/154.3; 174/655; 174/664

(58) Field of Classification Search .............. 285/151.1, 285/154.3, 154.4; 174/653–655, 660–665
See application file for complete search history.

(56) References Cited

U.S. PATENT DOCUMENTS

| | | | | | |
|---|---|---|---|---|---|
| 2,858,358 | A | * | 10/1958 | Hawke | 174/89 |
| 3,958,818 | A | * | 5/1976 | Mason | 285/92 |
| 4,350,840 | A | * | 9/1982 | Michaels | 174/655 |
| 4,481,697 | A | * | 11/1984 | Bachle | 24/135 R |
| 4,544,800 | A | * | 10/1985 | Katsuura | 174/653 |
| 4,549,755 | A | * | 10/1985 | Kot et al. | 285/341 |
| 4,630,850 | A | * | 12/1986 | Saka | 285/322 |
| 4,692,561 | A | * | 9/1987 | Nattel | 174/655 |
| 4,801,158 | A | * | 1/1989 | Gomi | 285/52 |
| 5,072,072 | A | * | 12/1991 | Bawa et al. | 174/655 |
| 5,589,663 | A | * | 12/1996 | Wales | 174/51 |
| 5,866,853 | A | * | 2/1999 | Sheehan | 174/653 |
| 5,927,892 | A | * | 7/1999 | Teh-Tsung | 403/259 |
| 5,951,327 | A | * | 9/1999 | Marik | 439/610 |
| 6,036,237 | A | * | 3/2000 | Sweeney | 285/322 |
| 6,099,046 | A | * | 8/2000 | Oh | 285/354 |
| 6,173,995 | B1 | * | 1/2001 | Mau | 285/55 |
| 6,254,145 | B1 | * | 7/2001 | Schwarz et al. | 285/319 |
| 6,435,567 | B2 | * | 8/2002 | Kikumori et al. | 285/319 |
| 6,616,194 | B1 | * | 9/2003 | Gretz | 285/151.1 |
| 6,764,107 | B1 | * | 7/2004 | Obahi et al. | 285/322 |
| 6,767,032 | B1 | * | 7/2004 | Gretz | 285/151.1 |
| 6,908,114 | B2 | * | 6/2005 | Moner | 285/23 |
| 2002/0079702 | A1 | * | 6/2002 | Baumann et al. | 285/343 |
| 2006/0219437 | A1 | * | 10/2006 | Chiu | 174/653 |

FOREIGN PATENT DOCUMENTS

| | | |
|---|---|---|
| TW | 295317 | 1/1997 |
| TW | 449169 | 8/2001 |
| TW | 511816 | 11/2002 |

* cited by examiner

Primary Examiner—James M Hewitt (57) ABSTRACT

A joint structure for connecting a corrugated pipe to a fixed part includes a main body, a packing screw cap, and a clamping claw. The clamping claw is sandwiched between the main body and the packing screw cap. The clamping claw defines a through slot at an edge thereof to make the clamping claw can enlarge an inside diameter thereof. A plurality of inner claws is formed at the edge of the clamping claw. A locking part protruding towards the center of the clamping claw is formed at an end of each of the inner claws. Two slits are respectively defined at two sides of each inner claw so that the inner claw has elasticity. The corrugated pipe with different diameters can directly insert into the clamping claw from outside, and the corrugated pipe cannot be dropped out directly.

8 Claims, 7 Drawing Sheets

JOINT STRUCTURE FOR QUICKLY CONNECTING CORRUGATED PIPE

BACKGROUND

1. Field of the Invention

The present invention relates to a field of corrugated-pipe jointing technology and, more particularly, to a joint structure for quickly connecting a corrugated pipe. The joint structure can make an inside diameter of its clamping claw generate a margin, so that the corrugated pipe with different diameters can directly insert into the clamping claw from outside.

2. Description of the Prior Art

A corrugated pipe is a kind of hollow pipe for protecting a cable from damage caused by entering of foreign matter such as percolating water, ants, dust, and so on. In order to follow a bend and distortion of the cable during its disposing, and to increase an agility and retractility of the corrugated pipe, annular bulgy portions and annular concave portions are alternately formed at an out edge of the corrugated pipe. Generally, when the cable needs to be inserted into a fixed part, a corrugated-pipe joint can be used for fixing the corrugated pipe. The corrugated-pipe joint can fix the corrugated pipe and avoid an arbitrary loose thereof. Further, the corrugated-pipe joint can prevent from water, ants, and dust. Related prior arts are disclosed, for example, in Taiwan Patent No. 295317 which is named "wire protecting pipe and joint structure", Taiwan Patent No. 511816 which is named "improved joint of wire protecting pipe", and Taiwan Patent No. 449169 which is named "joint structure for quickly connecting wire protecting pipe". These patents can connect the corrugated pipe to the fixed part. However, they have different problems as follow.

Firstly, for example, a limiting element in Taiwan Patent No. 295317 only utilize a barb to clasp a depressed portion of the protecting pipe without any astricting effect. Therefore, the protecting pipe is easily loosed when an outside force is applied thereto. Further, a sealing part thereof is only set on a contacting surface between a ring and a main body, the joint structure cannot effectively prevent from water and ants. Thus, the wire apparatus may be destroyed by damp or ant's gnawing.

Secondly, for example, though Taiwan Patent No. 449169 can quickly assemble and disassemble the protecting pipe, its action is not assured. A loose can be caused by a mistaken touch. At the same time, the joint structure cannot effectively resist a pull of an outside force, and the structure thereof is complicated.

Finally, for example, a pressing block of Taiwan Patent No. 511816 is pivotally assembled separately. The pressing block cannot be formed integratively, so it needs to be assembled. Further, the pressing block is not easy to be machined. In addition, the joint's action is also not assured. A loose can be cause by a mistaken touch, and the joint cannot effectively resist a pull of an outside force. What is more important is that the joint also cannot prevent from water.

As can be known from the above description, the disclosed or used corrugated-pipe joints have problems of deficient clamping force or bad waterproof capability, separately or together. At the same time, a problem of inconvenient detachability is further existed.

What is needed, therefore, is an improved joint structure.

BRIEF SUMMARY

A joint structure for connecting a corrugated pipe to a fixed part according to an embodiment of the present invention includes a main body and a clamping claw. The main body includes a first screw thread and a second screw thread respectively formed at two ends thereof. The first screw thread of the main body is configured for locking a packing screw cap. The second screw thread is configured to be locked to the fixed part via a screw cap. The clamping claw is an annular body and two ends thereof respectively contact against an end of the main body and an inner end of the packing screw cap. The clamping claw defines a through slot at an edge thereof to make the clamping claw has a margin for enlarging an inside diameter thereof. The through slot extends along an axis direction of the clamping claw. A plurality of elastic inner claws is formed at the edge of the clamping claw. A locking part protruding towards the center of the clamping claw is formed at an end of each of the inner claws. An end of the locking part corresponding to the packing screw cap forms a shrinked oblique guiding surface. Another end of the locking part corresponding to the main body forms an erect stopping surface.

Further, the joint structure can include a washer set on the second screw thread of the main body to increase a locking force of the screw cap.

Further, two slits are respectively defined at two sides of each inner claw so that the inner claw has an elasticity.

Further, the joint structure includes a waterproof tightening ring provided in the first screw thread and contacting against the clamping claw, and the waterproof tightening ring is made from a flexible waterproof material, and a flange is formed at an end of the waterproof tightening ring corresponding to the main body, and the flange can embed in an end of the corrugated pipe.

Further, a depressed rabbet is defined in the edge of the clamping claw corresponding to a surface of each inner claw, and a wedge is formed on the waterproof tightening ring so as to correspond to each depressed rabbet, and the waterproof tightening ring can engage with the clamping claw when the wedge embeds in the depressed rabbet.

Further, the waterproof tightening ring forms an inner bevel at the inner edge thereof so as to close contact the corrugated pipe.

Further, an annular flange is formed on the inner bevel of the waterproof tightening ring, and the annular flange can embed in the corrugated pipe so as to increase a fixation effect and a waterproof effect.

The joint structure according to the embodiment of the present invention has following increased benefits and efficacies. Firstly, the through slot of the clamping claw make the clamping claw has a margin for enlarging an inside diameter thereof. The corrugated pipe with different diameters can directly insert into the clamping claw to increase the advantage of the connection of the corrugated pipe. Secondly, the locking parts of the elastic inner claws can insert in the concave portion of the corrugated pipe, and an end of the locking part of the inner claw corresponding to the corrugated pipe is an oblique guiding surface, thus the corrugated pipe can be easily inserted. Another end of the locking part corresponding to the main body is an erect stopping surface, thus the corrugated pipe cannot be dropped out directly. Therefore, fixity is increased and a loose of the corrugated pipe under pull of outside force can be avoided. Thirdly, the waterproof tightening ring and the annular flange on the inner bevel of the waterproof tightening ring can increase a sealing area. The efficacy of preventing from water, ants and dust can be really achieved.

These features and advantages of the present invention will be fully understood and appreciated from the following detailed description of the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the figures to describe the present invention in detail.

Figure 1:
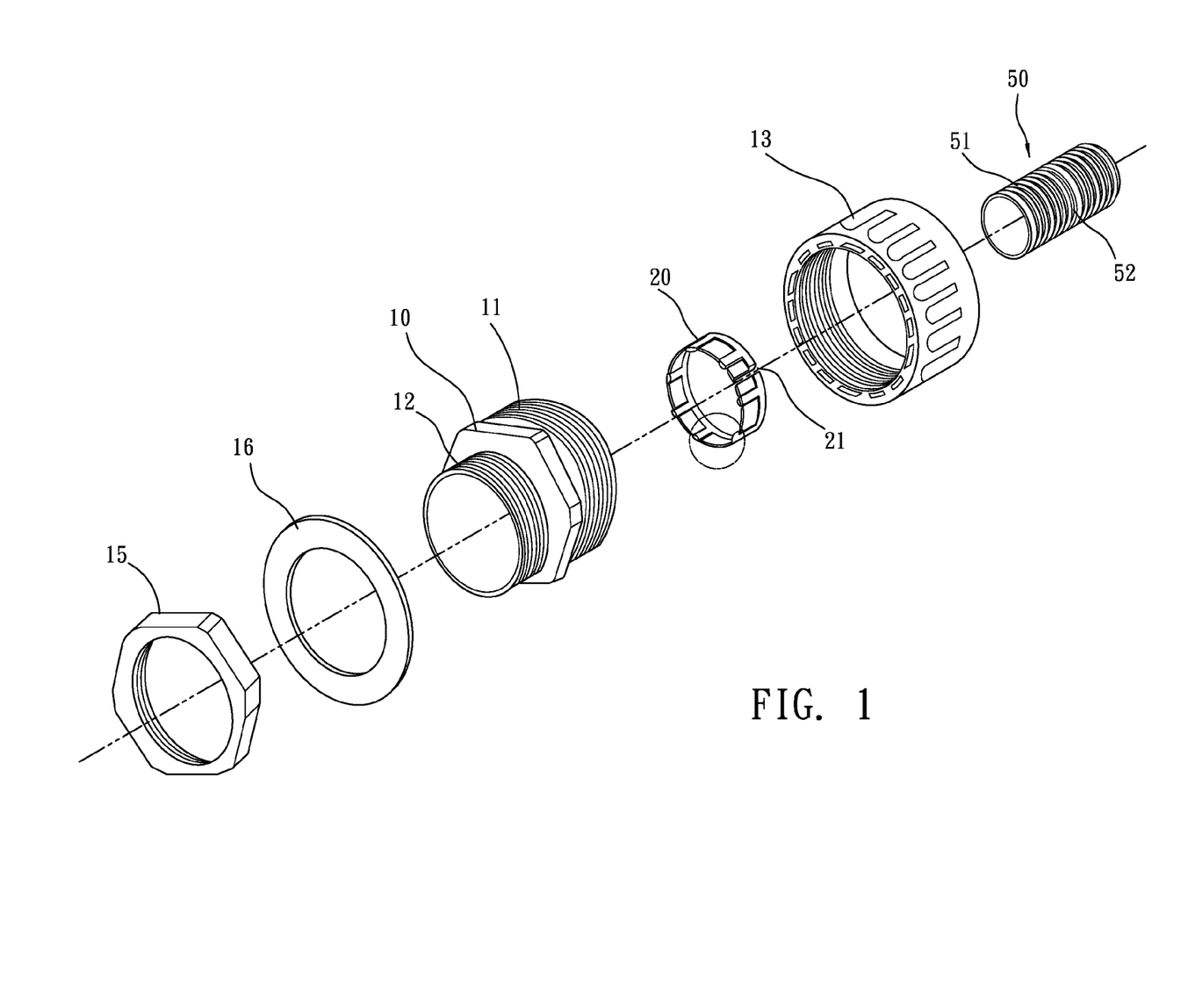
FIG. 1 is an isometric, exploded schematic view of a joint structure according to a first embodiment of the present invention, which illustrates an assembly of elements of the joint structure and theirs relative relationship.

Referring to FIG. 1, a joint structure according to a first embodiment of the present invention is shown. The joint structure includes a main body 10, a packing screw cap 13, a screw cap 15, and a clamping claw 20. The joint structure is configured for quickly connecting a corrugated pipe 50 and a fixed part. A plurality of bulgy portions 51 and a plurality of concave portions 52 are formed at an out edge of the corrugated pipe. The joint structure can lock the corrugated pipe to the fixed part. Thus, a quick assembling can be achieved, and an efficacy of preventing from water, ants, and dust can further be enhanced.

Referring to FIGS. 1 to 4, a detailed structure of the first embodiment is illustrated. The main body 10 is columnar and hollow. Two ends of the main body 10 form a first screw thread 11 and a second screw thread 12, respectively. The first screw thread 11 is configured to engage with the packing screw cap 13, so that the clamping claw 20 can lock the corrugated pipe 50. The second screw thread 12 of the main body 10 is configured to engage with the screw cap 15 and a washer 16, so that the joint structure can be locked to the fixed part.

Figure 2:
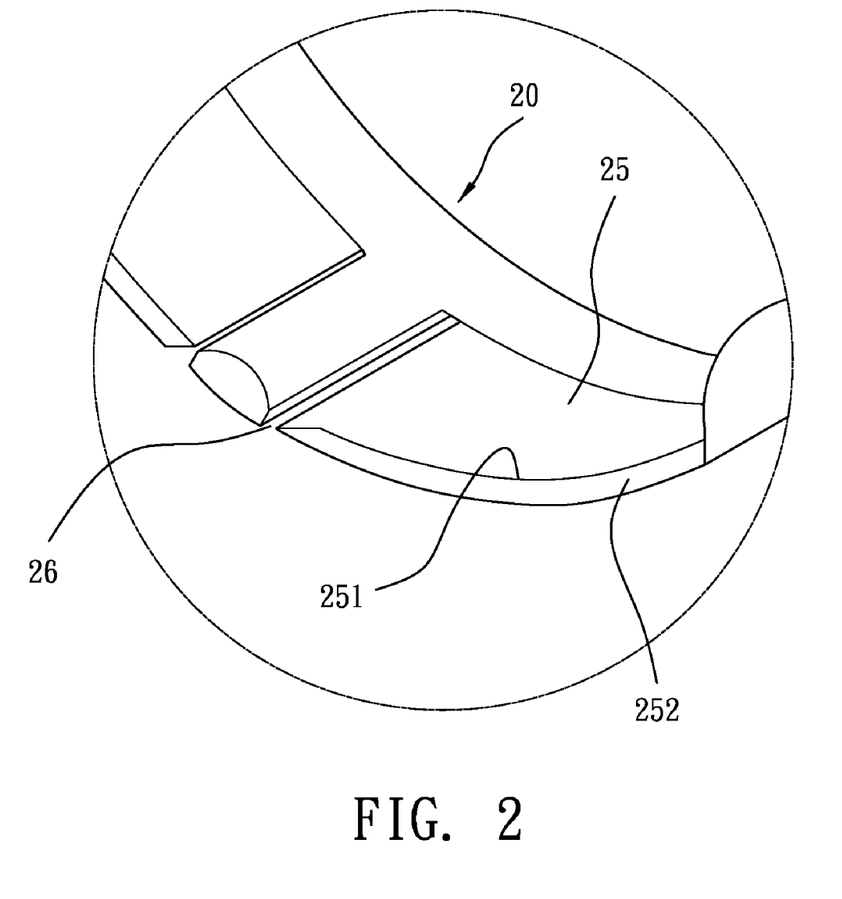
FIG. 2 is an enlarged, partial view of a clamping claw of the joint structure of FIG. 1.
Figure 3:
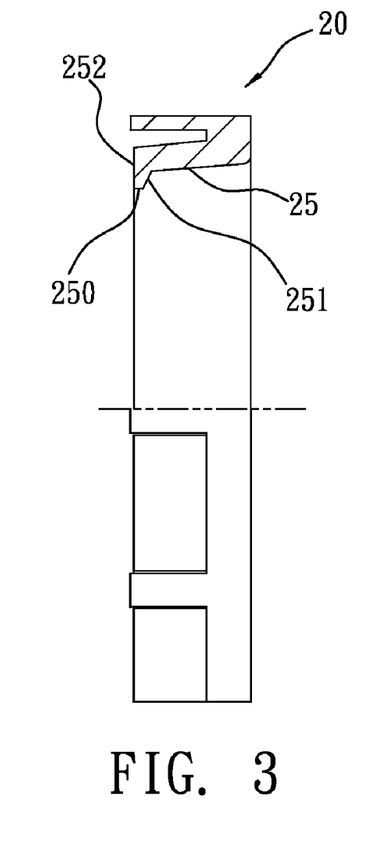
FIG. 3 is a schematic, cross-sectional view of the clamping claw of the joint structure of FIG. 1.

The clamping claw 20 is an annular body, and two ends thereof can respectively contact against an end of the first screw thread 11 of the main body 10 and an inner end of the packing screw cap 13. Further, the clamping claw 20 defines a through slot 21 at the edge thereof. The through slot 21 extends along an axis direction of the clamping claw 20, so that the clamping claw 20 has a margin for enlarging an inside diameter thereof. Referring to FIG. 2, the clamping claw 20 includes a plurality of inner claws 25 formed at the edge thereof. Two slits 26 are respectively defined at two sides of each inner claw 25, SO that an end of the inner claw 25 corresponding to the first screw thread 11 of the main body 10 can be elastic. Referring to FIG. 3, a locking part 250 protruding towards the center of the clamping claw 20 is formed at the end of each inner claw 25. The locking part 250 can embed in the concave portion 52 of the corrugated pipe 50. An end of the locking part 250 of the inner claw 25 corresponding to the packing screw cap 13 forms a shrinked oblique guiding surface 251. When the corrugated pipe 50 inserts into the clamping claw 20, the inner claw 25 can be pushed outwardly so as to directly and quickly connect the corrugated pipe 50 without unscrewing the packing screw cap 13. Therefore, the joint structure of the first embodiment is time-saved to be operated and is very expediently. Another end of the locking part 250 of the inner claw 25 corresponding to the main body 10 forms an erect stopping surface 252. When the corrugated pipe 50 is dropped out from the clamping claw 20, the locking part 250 of the inner claw 25 of the clamping claw 20 can stop the corrugated pipe 50. Therefore, a loose of the corrugated pipe 50 under pull of outside force can be avoided.

Thereby, the joint structure, which can quickly connect the corrugated pipe and cannot make the corrugated pipe be directly dropped out, is formed.

Figure 4:
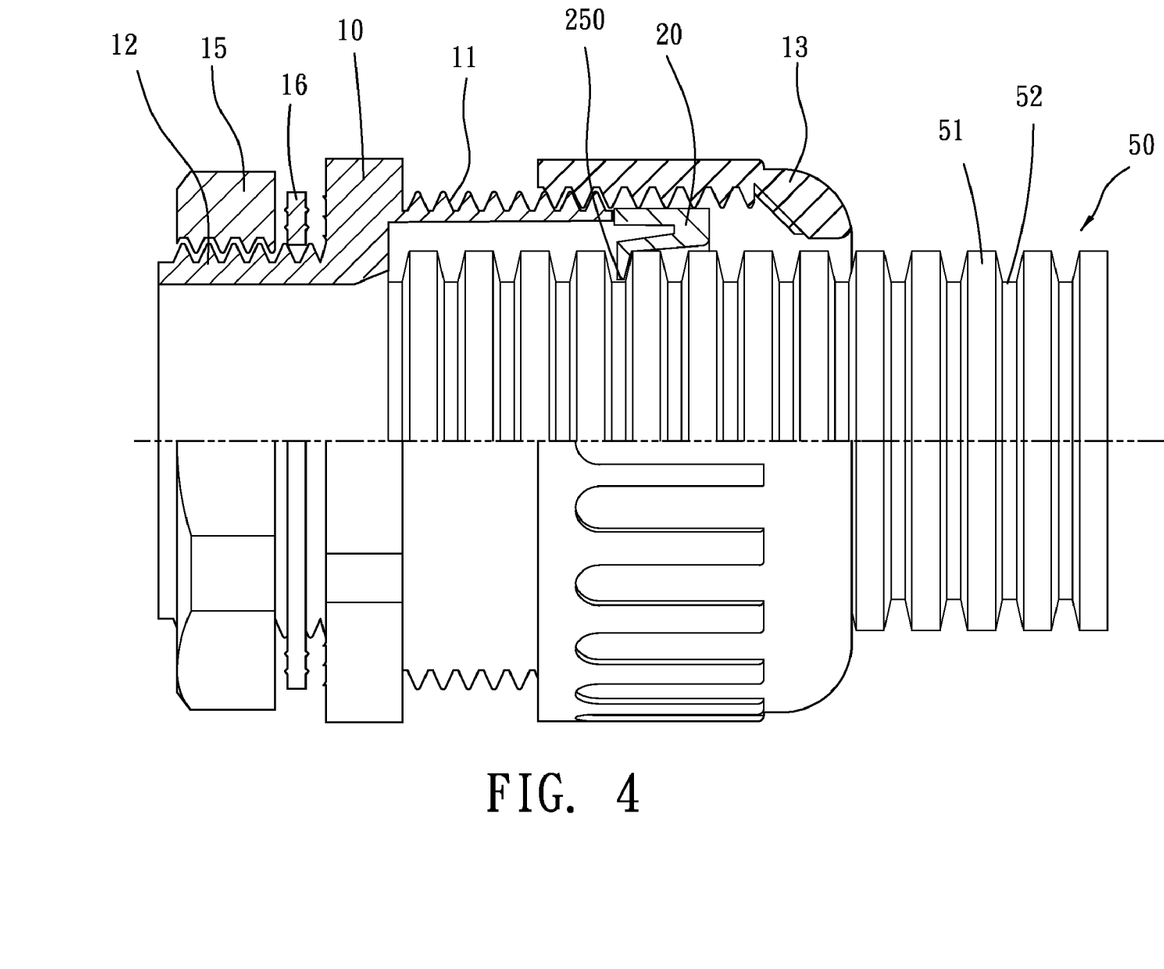
FIG. 4 is a half sectional view of the assembled joint structure of FIG. 1.
Figure 5:
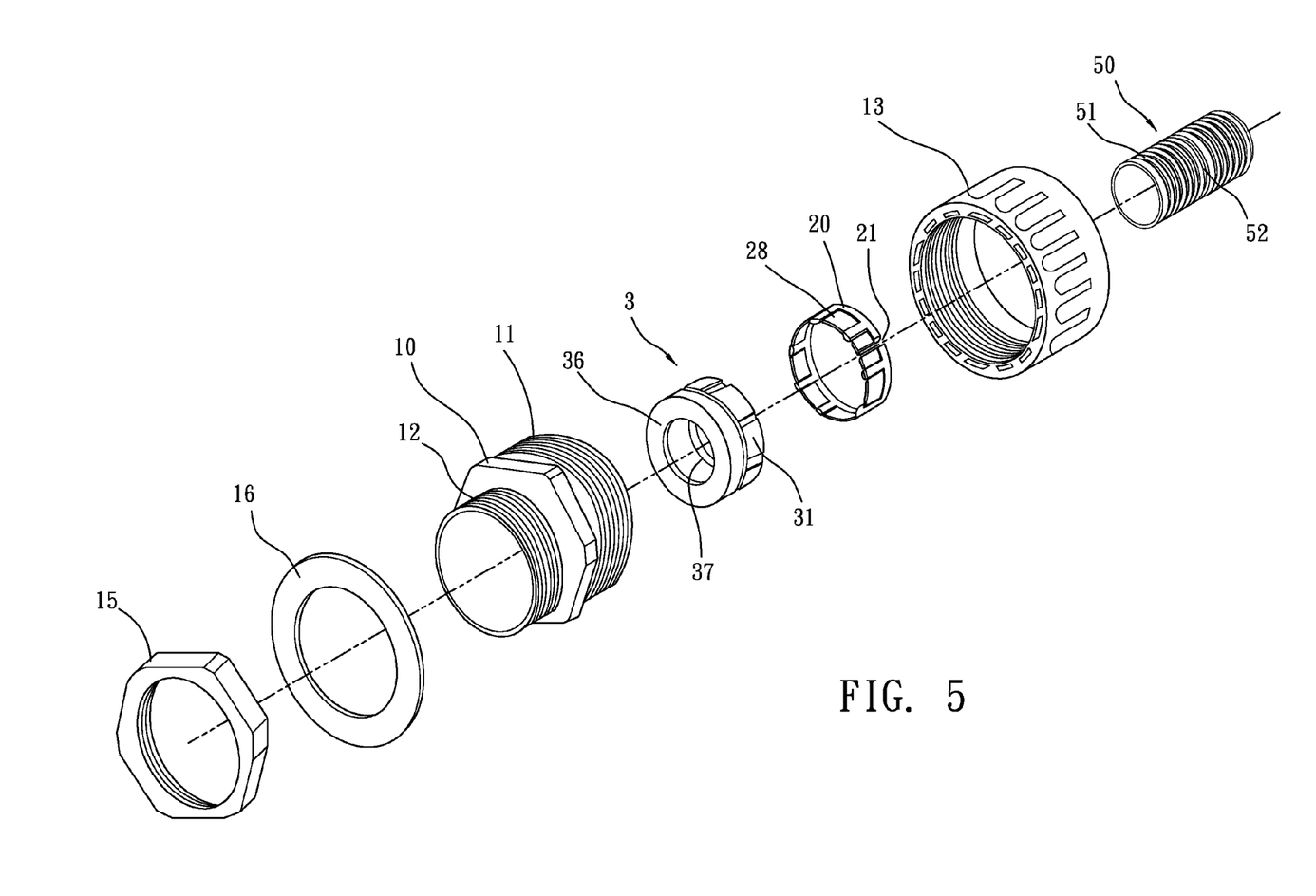
FIG. 5 is an isometric, exploded schematic view of a joint structure according to a second embodiment of the present invention, which illustrates an assembly of elements of the embodiment and theirs relative relationship.
Figure 6:
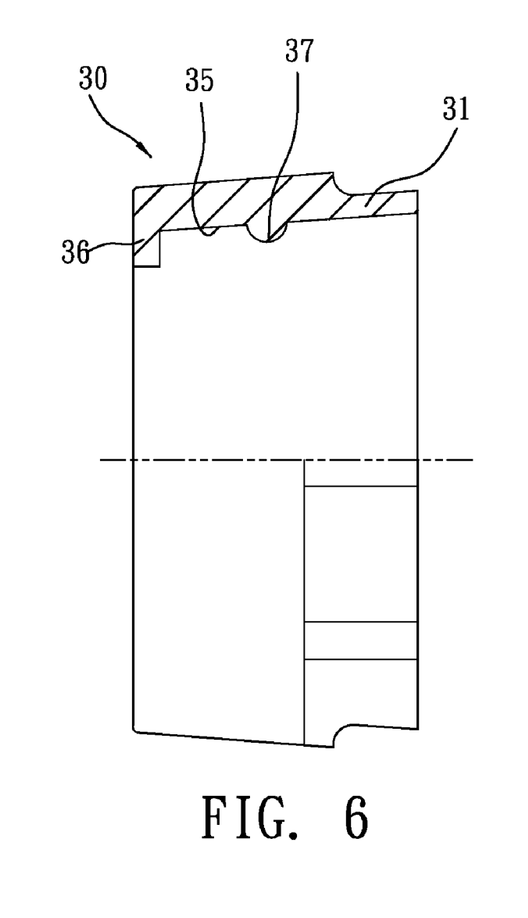
FIG. 6 is a half sectional view of a waterproof tightening ring of the joint structure according to the second embodiment of the present invention.
Figure 7:
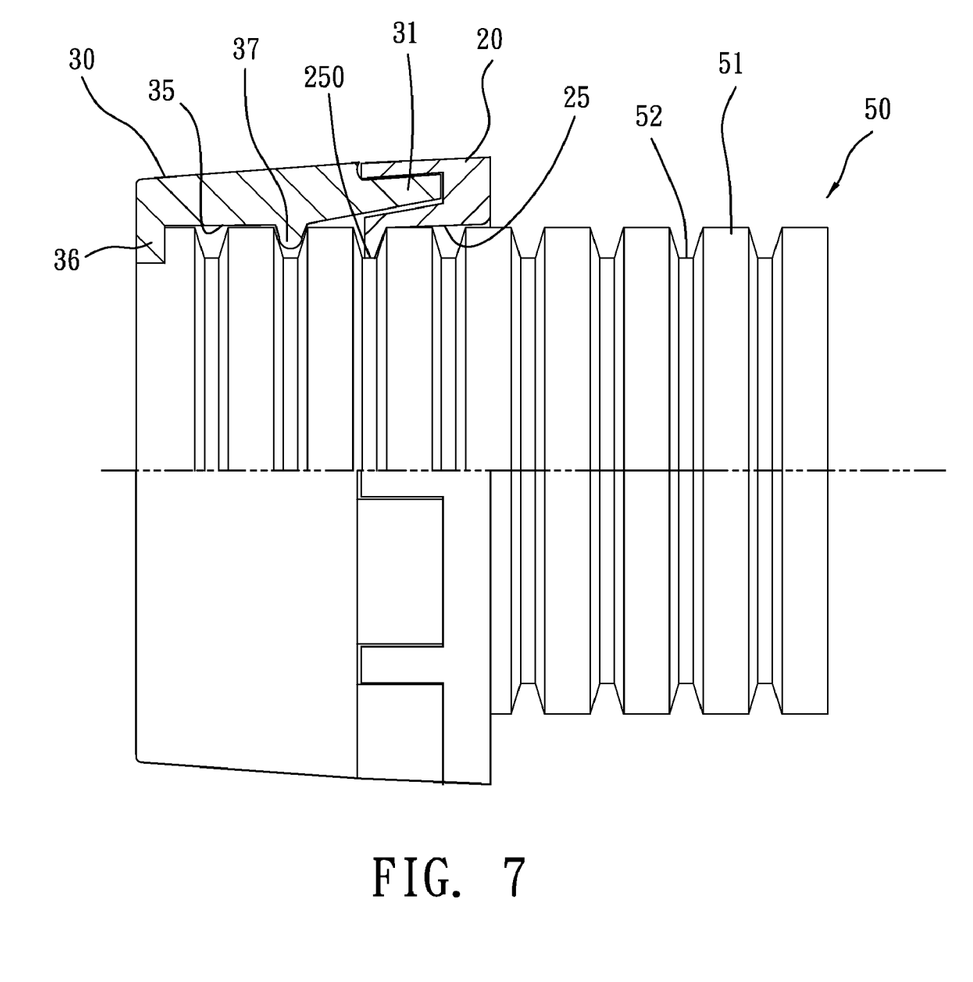
FIG. 7 is a half sectional view of an assembly of the waterproof tightening ring, the clamping claw, and the corrugated pipe of the joint structure according to the second embodiment of the present invention.
Figure 8:
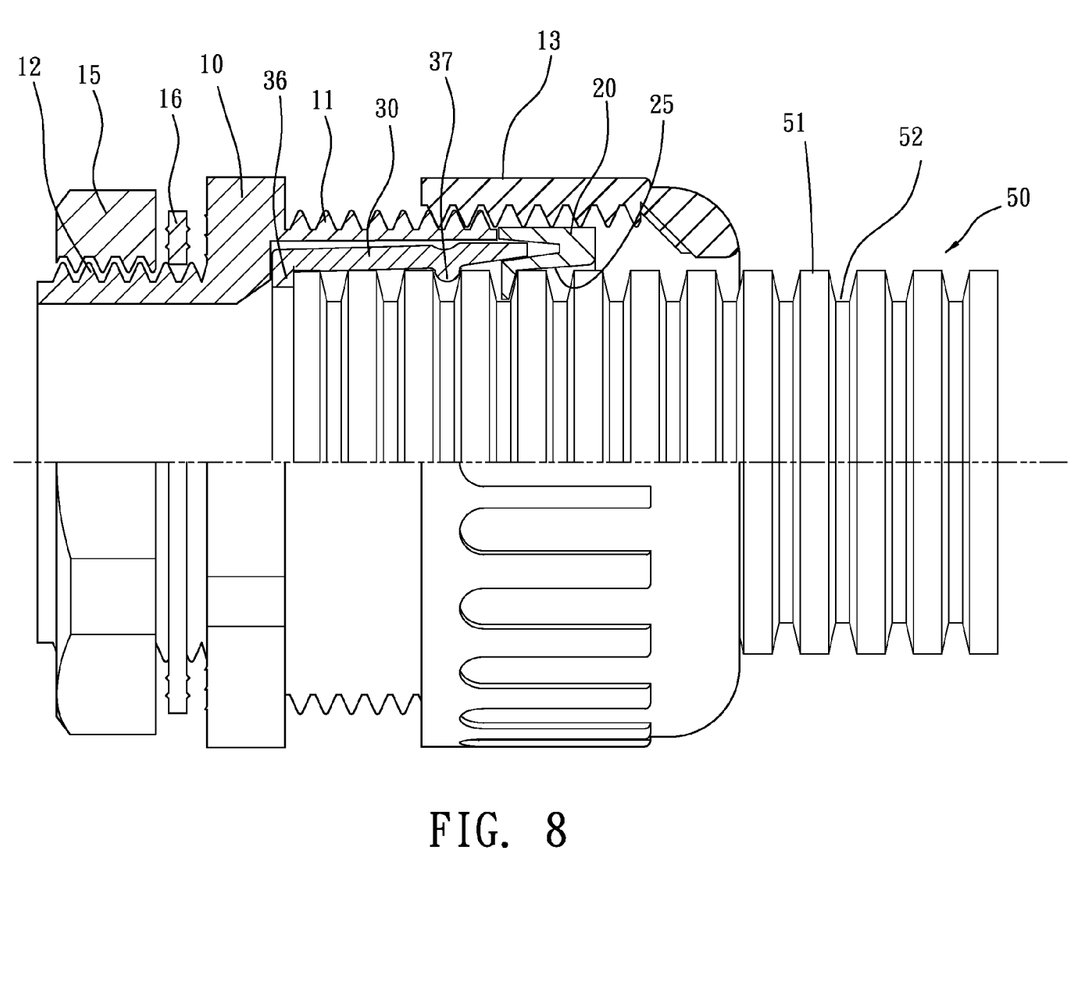
FIG. 8 is a half sectional view of the assembled joint structure according to the second embodiment of the present invention.

In operation, the corrugated pipe 50 can be fixed according to the following steps. Firstly, the corrugated pipe 50 of the main body 10 is inserted in the fixed part, and the screw cap 15 and the washer 16 clamp the main body 10 on the fixed part. Secondly, the clamping claw 20 is placed in the packing screw cap 13, and the packing screw cap 13 is slightly locked on the first screw thread 11 of the main body 10. Thirdly, the corrugated pipe 50 is directly inserted in the main body 10 through the packing screw cap 13 and the clamping claw 20. When the corrugated pipe 50 has a bigger size, the inside diameter of the clamping claw 20 can be enlarged via the margin generated by the through slot 21 of the clamping claw 20. Thus, the applicable scope of the corrugated pipe 50 can be increased. When the corrugated pipe 50 is further pushed in, the locking part 250 of the inner claw 21 of the clamping claw 20 can span the bulgy portion 51 of the corrugated pipe 50 one by one, and is received in one corresponding concave portion 52. Finally, the packing screw cap 13 is locked firmly to increase the fixity of the corrugated pipe 50. Therefore, the joint structure can easily connect the corrugated pipe and avoid the corrugated pipe from being detached.

In order to detach the corrugated pipe, the packing screw cap 13 needs to be released reversely. After the packing screw cap 13 is detached, the inside diameter of the clamping claw 20 can be enlarged via the through slot 21 and the elasticity thereof, so as to detach the corrugated pipe 50.

Referring to FIGS. 5 to 8, a joint structure according to a second embodiment of the present invention is also shown. Then difference between the second embodiment and the first embodiment is that the second embodiment further includes a waterproof tightening ring 30 provided in the first screw thread 11 of the main body 10. The waterproof tightening ring 30 is made from a flexible waterproof material. A depressed rabbet 28 is defined in the edge of the clamping claw 20 corresponding to a surface of each inner claw 25. A wedge 31 is formed on the waterproof tightening ring 30 so as to correspond to each of the depressed rabbets 28. Thus, the waterproof tightening ring 30 can engage with the clamping claw 20 when the wedges 31 embed in the depressed rabbets 28. The waterproof tightening ring 30 forms an inner bevel 35 at the inner edge thereof. A flange 36 is formed at an end of the waterproof tightening ring 30 corresponding to the main body 10. The flange 36 can embed in the endmost concave portion 52 of the corrugated pipe 50. An annular flange 37 is further formed on the inner bevel 35 of the waterproof tightening ring 30. The annular flange 37 can embed in a corresponding concave portion 52 of the corrugated pipe 50. Thus, the fixation effect can be increased, and the waterproof effect can also be enhanced.

The joint structure of the second embodiment has the same manner with the first embodiment to connect and detach the corrugated pipe 50, and has the same efficacy. In addition, the joint structure of the second embodiment can close contact the corrugated pipe 50 via the inner bevel 35 of the waterproof tightening ring 30. The engagement of the annular flange 37 and the concave portion 52 can greatly increase the efficacy of preventing from water, ants, and dust.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A joint structure for connecting a corrugated pipe to a fixed part, the corrugated pipe having a plurality of bulgy portions and a plurality of concave portions formed at an outer surface thereof, comprising:
    a main body comprising a first screw thread and a second screw thread respectively formed at two ends thereof, the first screw thread of the main body being configured for locking a packing screw cap, the second screw thread being configured to be locked to the fixed part via a screw cap set thereon;
    a clamping claw that is an annular ring, two ends thereof respectively contacting against an end of the main body and an inner end of the packing screw cap, the clamping claw defining a cut through slot to make the clamping claw have a margin for enlarging an inside diameter thereof, the cut through slot extending along an axis direction of the clamping claw, a plurality of elastic inner claws being formed at an edge of the clamping claw, a locking part protruding towards the center of the clamping claw being formed at an end of each of the inner claws, an end of the locking part corresponding to the packing screw cap forming an oblique guiding surface, another end of the locking part corresponding to the main body forming an erect stopping surface such that as the corrugated pipe inserts into the clamping claw, the bulgy portions push on the oblique guiding surfaces to make the inner claws move outwardly until the locking parts are engaged in one of the concave portions, and as the corrugated pipe is dropped out from the clamping claw, the bulgy portions push on the erect stopping surfaces but are stopped thereby so that the corrugated pipe is not drawn out unless completely releasing the packing screw cap from being engaged with the main body; and
    a waterproof tightening ring provided within the first screw thread and contacting against the clamping claw, wherein the waterproof tightening ring is made from a flexible waterproof material, and an annular flange is formed at an inner surface of the waterproof tightening ring to be engaged in another one of the concave portions.

2. The joint structure as claimed in claim 1, wherein a plurality of wedges are formed on the waterproof tightening ring to respectively correspond to the inner claws so that the waterproof tightening ring is engaged with clamping claw.

3. The joint structure as claimed in claim 1, wherein the waterproof tightening ring forms an inner bevel at the inner surface thereof so as to closely contact the corrugated pipe.

4. The joint structure as claimed in claim 2 wherein the waterproof tightening ring forms an inner bevel at the inner surface thereof so as to closely contact the corrugated pipe.

5. The joint structure as claimed in claim 3, wherein the annular flange is formed on the inner bevel of the waterproof tightening ring, and the annular flange is engaged in the concave portion so as to increase a fixation effect and awaterproof effect.

6. The joint structure as claimed in claim 4, wherein the annular flange is formed on the inner bevel of the waterproof tightening ring, and the annular flange is engaged in the concave portion so as to increase a fixation effect and a waterproof effect.

7. The joint structure as claimed in claim 1, wherein the joint structure further comprises a washer set on the second screw thread of the main body to increase a locking force of the screw cap.

8. The joint structure as claimed in claim 1, wherein two slits are respectively defined at two sides of each inner claw so that the inner claws have elasticity.

* * * * *